2,510,137

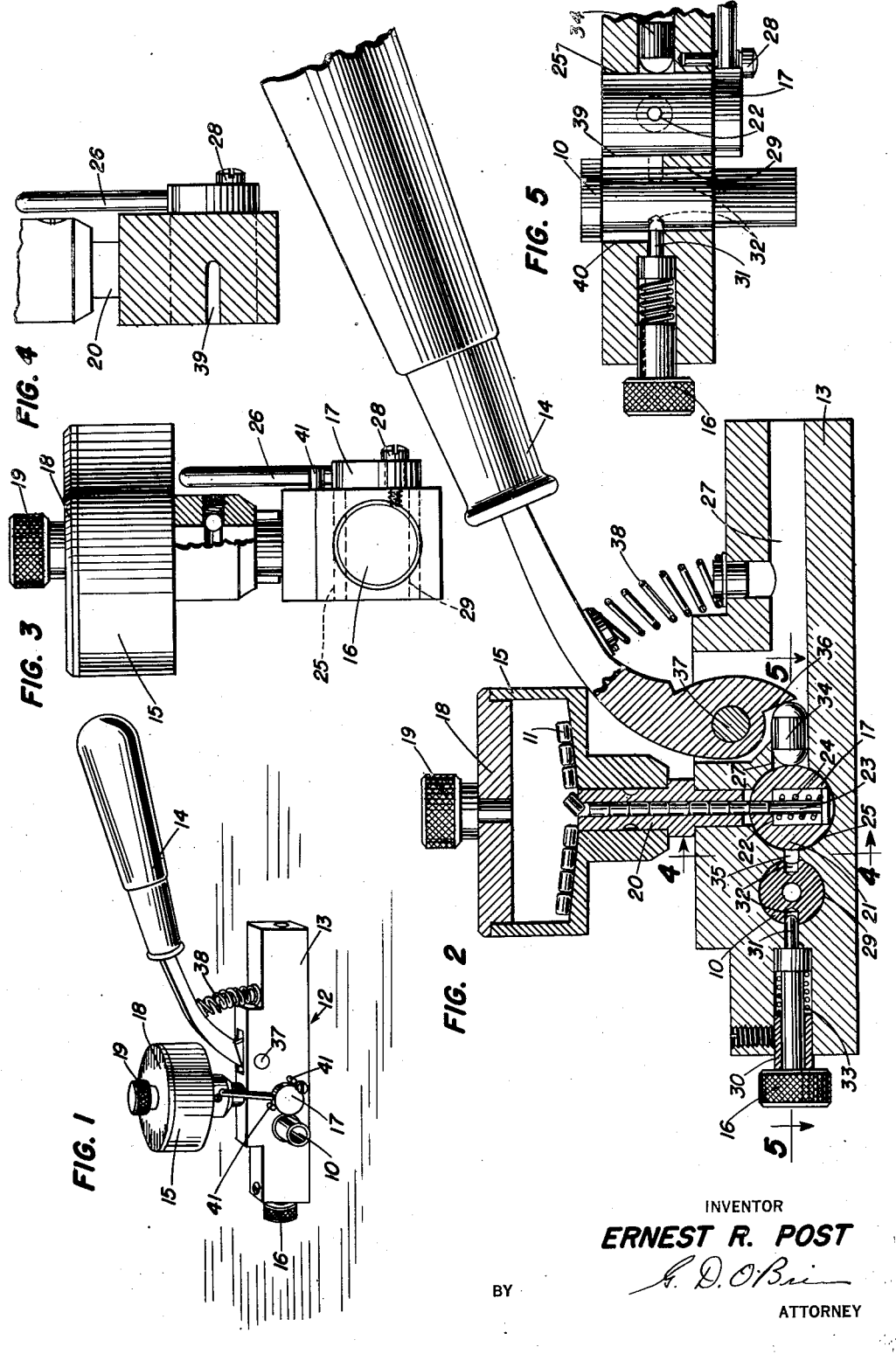
June 6, 1950 — E. R. POST — 2,510,137
PIN INSERTING DEVICE
Filed Dec. 2, 1946 — 2 Sheets-Sheet 1
INVENTOR
ERNEST R. POST
BY
ATTORNEY June 6, 1950 E. R. POST 2,510,137
PIN INSERTING DEVICE
Filed Dec. 2, 1946 2 Sheets-Sheet 2
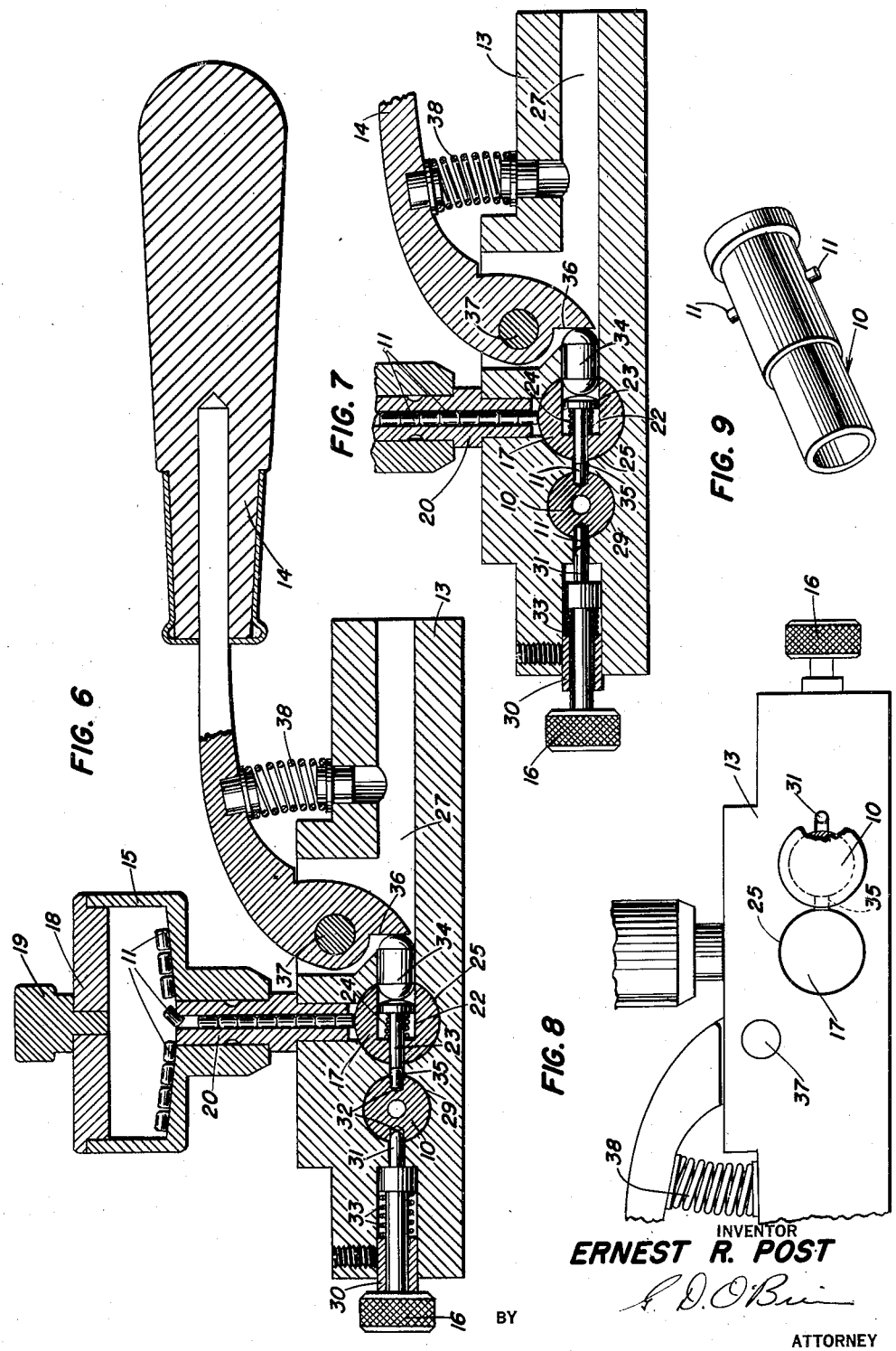
INVENTOR
ERNEST R. POST
ATTORNEY Patented June 6, 1950

UNITED STATES PATENT OFFICE 2,510,137

PIN INSERTING DEVICE

Ernest R. Post, Washington, D. C.

Application December 2, 1946, Serial No. 713,449

6 Claims. (Cl. 29—212)

The present invention relates to a device for inserting and securing a pin, rivet or equivalent means in a workpiece or an element thereof. In particular this invention relates to a device for inserting and securing pins in the preformed holes in an element of a detonating fuze.

An object of the invention is to provide simple and effective means which will position a workpiece whereby a pin or rivet may be readily inserted into a preformed opening in said workpiece.

Another object of the invention is to provide means having a magazine and feed system whereby pins or rivets are simply and effectively fed and positioned for inserting into preformed openings in successive workpieces.

Another object of the invention is to provide simple and rugged means which will in a single operation rapidly and readily insert a pin or rivet into a preformed opening in a workpiece and secure said pin or rivet in said opening by expanding the pin or rivet or by forcing the pin or rivet into an undersized opening.

A still further object of the invention is to provide a simple and effective means which will position a workpiece, feed and correctly position a pin or rivet relative to the workpiece, and insert and secure said pin or rivet in a preformed opening in said workpiece.

Other objects and advantages of this invention will become apparent from the following description taken in connection with the accompanying drawings, and it will be understood that many changes may be made in the arrangement and details of parts described without departing from the spirit of the invention as set forth in the accompanying claims. I therefore do not wish to be limited to the exact details shown and described as the preferred form only has been shown by way of illustration.

In the accompanying drawings:

Fig. 1 is a perspective view of the device embodying the invention.

Fig. 2 is a front elevational view, partly in section.

Fig. 3 is an end elevational view, partly in section.

Fig. 4 is a sectional view taken on line 4—4 of Fig. 2.

Fig. 5 is a sectional view taken on line 5—5 of Fig. 2.

Fig. 6 is a front elevational view, in section, of the device in the process of inserting the first pin in an element of a fuze.

Fig. 7 is a similar view of the device in the process of inserting the second pin in an element of a fuze.

Fig. 8 is a rear elevational view of a part of the device as seen in Fig. 7.

Fig. 9 is a perspective view of a fuze element after two pins have been inserted and secured therein by means of the device.

The method generally employed in the past for inserting and securing a pin in a preformed hole in such a workpiece as the fuze element 10 illustrated in Fig. 9 has been inefficient in regard to the time consumed in the operation and the non-uniformity and poor workmanship of the finished product. This has been due in large part to the relatively small size of the element 10 and the pins 11. The method formerly employed required the use of various tools such as a means to securely support the element, a pin driver device to correctly hold and position the pin relative to the hole in the fuze element and a hammer to drive the pin. The present invention not only eliminates the necessity for all such tools but reduces the time of the operation by at least one-half and in addition results in a uniform product devoid of the many tool marks previously encountered.

The pin inserting device 12 embodying the present invention comprises a block 13, a pivoted handle 14, a magazine 15, a plunger locator 16 and a pin locating element 17. The magazine, including a cover 18 having a knob 19 thereon, holds a quantity of pins 11 which are fed through the feed tube 20 to the pin locating element 17. This element 17 has a cylindrical body 21 which has a transverse bore 22 therein. The bore 22 is enlarged at one end to house the plunger 23; the small end of the bore is of sufficient diameter to just receive a pin 11 and slightly longer than the length of a pin. The plunger 23 is of sufficient length to just extend in its inoperative position into the reduced end of the bore, thereby to provide one end of the pin chamber formed by the bore. This recessive plunger is ordinarily maintained in this position by the helical spring 24. The combined length of the tip end of plunger and of a single pin on top of it is approximately equal to the length of the bore 22 in the pin locating element 17. The reason for this will be apparent from the description of operation of the pin inserting device given below. The body 21 of the pin locating element 17 is rotatably mounted in the transverse bore or cavity 25 in the block 13. The pin locating element is rotated by the handle 26 between two positions, this rotation being limited by the stops 41. In the one position, seen in Fig. 2, the axis of the bore 22 in the body 17 is aligned with the feed tube 20; in the second position, seen in Fig. 6, this axis is aligned with the axis of the bore 27, which passes longitudinally through the block 13. The pin locating element is retained in the bore 25 by the screw 28.

The block 13 includes a second transverse bore or cavity 29 which is adapted to receive the workpiece being operated upon, in this instance the fuze element 10. The element 10 is accurately positioned in the pin inserting device by means of the plunger locator 16. This plunger locator, spring pressed by the helical spring 33, passes through the sleeve 30 and terminates in a plunger-like projection 31 which is adapted to pass through a reduced section of the longitudinal bore 27 and impale the workpiece by engaging in one of the two holes 32 in the workpiece. This correctly positions the element 10 in a predeterminedly oriented position in the pin inserting device whereby the other hole 32 in the element 10 is automatically aligned with that portion 35 of the longitudinal bore 27 communicating between the cavities 25 and 29.

When the pin locating element 17 is rotated to the second of the two positions mentioned above the transverse bore 22 therein is not only aligned with the hole 32 in the fuze element but the plunger 23 aligns itself with the bullet-shaped plunger or pusher 34 positioned in the bore 27. The enlarged portion of the bore 22 in the pin locating element 17 is of sufficient diameter to readily receive the pusher 34, the end of which is adapted to contact the head of plunger 23 and drive it against the action of the spring 24 whereby a pin 11 in the reduced or pin chamber section of the bore 22 is passed through the communicating portion 35 of the longitudinal bore into the hole 32. The hole 32 may be slightly undersized whereby a force fit is obtained between the fuze element 10 and the pin 11. As an alternative a slightly smaller pin could be employed which could be expanded in the larger hole 32 by suitable pressure by the plunger 23 upon the end of the pin.

The pusher 34 is driven by the lever action of the surface 36 about the pivot 37. This surface 36 formed at the end of handle 14 drives the plunger 34 into the bore 22 when the handle is forced downward against the action of the helical spring 38 (see Fig. 6). When the handle 14 is released the pusher 34 is forced back out of the bore 22 by the action of the spring 24 on the plunger 23.

The operation of the device described above is as follows:

The fuze element or workpiece 10 is inserted into the cavity 29 by first withdrawing the plunger locator 16. The latter is then released and the element 10 rotated until the plunger 31 slips into one of the two holes 32 in the fuze element to temporarily lock it in the first of its predeterminedly oriented positions. The pin locating element 17 is now rotated to the position illustrated in Fig. 2 in which position a pin 11 will feed by gravity through the feed tube 20 into the chamber portion of the bore 22 in the pin locating element. The latter is now rotated through 90 degrees to the position illustrated in Fig. 6. The handle 14 is forced downward driving the pusher 34 into the bore 22; the pusher 34 drives the plunger 23, which in turn forces the pin 11 through the section 35 of the longitudinal bore and into the hole 32 wherein it is secured by a force fit of the pin 11 in the hole 32 or by the expansion of the pin in the hole by the use of adequate pressure upon the handle 14. The handle is released and the pin locating element rotated back to its first position to receive a second pin 11. The plunger locator 16 is withdrawn and the fuze element 10 is slid out of the cavity 29. This is possible since a slot 39 in the block communicates with the portion 35 of the longitudinal bore which allows the pin projecting from the body of the fuze element to slide therein as the element 10 is withdrawn. This fuze element is now rotated 180 degrees and, with the plunger locator 16 withheld in an inoperative position, the fuze element is reinserted in the cavity 29. A second slot 40 permits the fuze element to be reinserted by receiving the pin 11 which had been previously secured in the hole 32 of the element 10. When this element has been inserted as far as it will go, the second hole 32 will have been properly set in the second one of its predeterminedly oriented positions for reception of the second rivet as seen in Fig. 7. The pin locating element 17 is again rotated 90 degrees to the position illustrated in Fig. 7 and the handle 14 depressed to insert and secure the second pin in the second hole in the fuze element. The handle is released and the fuze element withdrawn.

While the present embodiment of the invention is particularly adapted to function only with the fuze element 10 in which the holes 32 are diametrically opposed, it is obvious that the plunger locator 16 may be positioned elsewhere in the block 13 to properly position an element having holes located other than diametrically opposed therein. It is also apparent that the invention may be adapted to accommodate an element or workpiece non-circular in cross section, in which event the plunger locator may not be necessary. It is apparent, too, that the present invention may be employed to insert and secure a pin or rivet in the aligned holes of several concentric elements to permanently fasten such elements together.

The invention herein described may be manufactured and used by or for the Government of the United States of America for governmental purposes without the payment of any royalties thereon or therefor.

I claim:

1. In a pin inserting device, the combination of means adapted to position and hold a workpiece in said device including means constructed and adapted to engage in one of several openings in said workpiece, a magazine and pin feeding mechanism, a pin locating element having a bore therein and being movable within the device, the pin locating element in one position being adapted to receive within its bore a pin from said feeding mechanism and in a second position being adapted to position said pin adjacent to and in alignment with an opening in said workpiece, a plunger adapted to enter the bore in the pin locating element when in the second position, means to drive the plunger into the bore to force the pin out of the bore and into the adjacent opening in the workpiece, and means within said bore to return the plunger to its original position outside the bore after the pin has been driven into the opening in the workpiece.

2. In a pin inserting device, the combination of spring-actuated means adapted to position and hold a workpiece in said device including means constructed and adapted to engage in one of several openings in said workpiece, a magazine and pin feeding mechanism, a pin locating element having a bore therein and being movable within the device, the pin locating element in one position being adapted to receive within its bore a pin from said feeding mechanism and in a second position being adapted to position said pin adjacent to and in alignment with an opening in said workpiece, a plunger adapted to enter the bore in the pin locating element when in the second position, lever means adapted to drive the plunger into the bore to force the pin out of the bore and into the adjacent opening in the workpiece, and spring means within said bore continuously biased to return the plunger to its original position outside the bore after the pin has been driven into the opening in the workpiece.

3. In a pin inserting device, the combination of spring-actuated means adapted to position and hold a workpiece in said device including means constructed and adapted to engage in one of several openings in said workpiece, a magazine and pin feeding mechanism, a pin locating element positioned adjacent to the feeding mechanism and having a bore therein adapted to receive a pin from said feeding mechanism, the pin locating element being movable in said device to a second position whereby the pin received in said bore is positioned adjacent to and aligned with an opening in the workpiece, a plunger movably mounted in the device and positioned to enter the bore in the pin locating element when the latter has been moved to the second position, lever means contacting the plunger to drive it into the bore to force the pin out of the bore and into the adjacent opening in the workpiece, and spring means within said bore continuously biased to return the plunger to its original position outside the bore after the pin has been driven into the opening in the work piece.

4. In a pin inserting device, a pair of plungers operative at opposite sides of a reversible workpiece which has a pair of diametrically separated holes, the first of the plungers to occupy one of the holes to position and lock the workpiece, a pin magazine and feeding means to supply a pin for each of the holes, a pin locating element carrying the second plunger, said element being movable from one position whereat it receives a pin ahead of said second plunger from the feeding means to a position of registration of said second plunger with the other workpiece hole and a consequent pin delivering position, a pusher to then act on the second plunger to drive the pin into the registering hole, and a spring behind the first plunger temporarily holding that plunger in the locking position but capable of yielding for the occupancy of the space of said plunger by the driven-in pin upon reversal of the workpiece preparatory to a repetition of the receiving and delivering movements of the pin locating element and of the pusher with respect to the then vacant workpiece hole.

5. In a device for inserting a pin in a hole in each of opposite sides of a workpiece, a block in which the workpiece is settable in each of two pin drive-in positions, a pin locating element movable in the block from a pin receiving position to a pin delivering position in registration with one of the holes, a pusher to drive a pin from said element in each of its delivering positions, and a pair of recessive plungers each serving as a pin-follower, respectively being carried by the block and by the locating element, the block-carried plunger temporarily projecting into one of the holes of the workpiece to lock it while in its first pin drive-in setting but held recessive by said driven pin in the second setting of the workpiece, the second plunger being carried by said element and recessive therein to provide a chamber for each of the pins in the receiving position and being displaceable by the pusher in each pin drive-in position to drive a pin into the workpiece in each of its successive settings.

6. In a pin inserting device, a block having a cavity in which a workpiece with a hole in each of opposite sides is withdrawable and resettable, said block having slots communicating with the cavity to provide outlets for the driven pins upon withdrawal of the workpiece, a pin locating element movable within the block from a pin receiving position to a pin delivering position in registration with one of the holes and slots, a plunger carried by said element and adapted to be moved when in the pin delivering position to drive a pin through one slot into one hole whereupon the workpiece is withdrawn, and a locator plunger preliminarily projecting through the other slot and into the other hole to initially lock the workpiece, subsequently being held displaced therefrom upon reinsertion and reversal of the workpiece preparatory to a repetition of the foregoing performance of the pin locating element and its carried plunger.

ERNEST R. POST.

REFERENCES CITED

The following references are of record in the file of this patent:

UNITED STATES PATENTS

| Number | Name | Date |
| --- | --- | --- |
| 302,282 | Pusch | July 22, 1884 |